United States Patent [19]

Gugliemelli et al.

[11] 3,984,361
[45] Oct. 5, 1976

[54] PREPARATION OF STARCH GRAFT POLYMER LATEXES BY SONIFICATION

[75] Inventors: Lewis A. Gugliemelli, Pekin; Charles L. Swanson, Dunlap; Charles R. Russell, Peoria, all of Ill.

[73] Assignee: The United States of America as represented by the Secretary of Agriculture, Washington, D.C.

[22] Filed: May 30, 1975

[21] Appl. No.: 582,572

[52] U.S. Cl. .................. 260/17.4 GC; 204/159.12; 260/17.4 ST
[51] Int. Cl.² ........................................... C08L 3/00
[58] Field of Search .... 260/17.4, 17.4 GC, 17.4 ST; 204/159.12, 157.1 S, 158 S

[56] References Cited
UNITED STATES PATENTS

| | | | |
|---|---|---|---|
| 2,407,462 | 9/1946 | Whiteley | 204/157.1 |
| 2,922,768 | 1/1960 | Mino et al. | 260/17.4 |
| 3,607,799 | 9/1971 | Barbehenn | 260/17.4 |
| 3,669,915 | 6/1972 | Jones et al. | 260/17.4 |
| 3,716,391 | 2/1973 | Hosoda et al. | 260/17.4 |

FOREIGN PATENTS OR APPLICATIONS

| | | | |
|---|---|---|---|
| 831,197 | 3/1960 | United Kingdom | 204/159.12 |

OTHER PUBLICATIONS

Chemical Engineering, Jan. 1971, Browning, "Putting Sound-Waves to Work," pp. 32–34.

Primary Examiner—Edward M. Woodberry
Attorney, Agent, or Firm—M. Howard Silverstein; David G. McConnell; Curtis P. Ribando

[57] ABSTRACT

Starch graft polymer latexes as well as processes for their preparations are disclosed. The starch graft latexes are water-dispersed grafted starch particles (300–1500 A in size) consisting of either (1) a cationic starch graft polymerized with up to 66% by weight of either nonionic or cationic vinyl monomers alone or with selected combinations thereof or (2) a nonionic starch graft polymerized with a cationic monomer alone or in combination with nonionic monomers. The latexes, having a range of properties, dry at 25° C. or at higher temperatures to clear continuous films.

12 Claims, No Drawings

PREPARATION OF STARCH GRAFT POLYMER LATEXES BY SONIFICATION

BACKGROUND OF THE INVENTION

This invention relates to the preparation of latexes made from starches derived from annually renewing agricultural sources, and vinyl monomers derived from annually diminishing fossilized sources. The products of our invention are as effective in a number of applications as conventional latexes made wholly from vinyl monomers. Therefore, the practice of our invention can reduce cost and conserve petrochemicals because less of the vinyl component which is more costly than starch is required in our novel latexes.

Review articles (*Graft Copolymers*, H. A. Battaerd and G. W. Tregear, eds., Interscience Publishers, 1967; and *Block and Graft Copolymers*, R. J. Ceresa, ed., John Wiley and Sons, 1973) cover the preparation and development of starch graft polymers prior to 1973. These articles and the literature thereafter up to the work of Gugliemelli et al. (J. Polym. Sci. 12: 2683 (1974)) do not mention starch graft latex products or concepts.

It is known that latex preparation is dependent on particle size and particle stability. Particle sizes should be on the order of a micron or less.

Stability of latexes prepared by classical emulsion polymerization (*Principles of Polymer Chemistry*, P. J. Flory, Univ. Press, Ithaca, New York, 1953) is attributed to polymerization of vinyl monomers within soap or detergent micelles to form polymer particles that are stabilized subsequent protective colloid action of adsorbed surfactants. Merely grafting vinyl monomers onto granular starch or cationic starches produce insoluble products whose aqueous slurries dry to opaque powders of no demonstrable utility.

We were surprised, therefore, when we discovered that stable latexes could be formed without the use of soaps, detergents, or emulsion polymerizations by the following steps:

a. graft polymerizing gelatinized cationic starch with a vinyl monomer in quantities such that a vinyl monomer add-on of from about 10% to 200% occurs in the presence of cerium(IV) initiator in an aqueous media containing from 1% to 20% solids; and b. sonicating the dispersion resulting from step (a) at 20 KHz for 1–3 minutes to form a stable dispersion containing cationic starch graft latex solids having particle diameters of from 300 to 1500 A, said stable dispersion having a Brookfield viscosity of from 10 to 100 cp.

From our disclosure of reaction and reactant parameters in making starch graft latexes it will be evident to those skilled in the art how to prepare a great variety of reinforcers in rubber. Those latexes having strong cationic character functioned well as additives in wet-end addition in paper making by imparting dry strength to paper. In particular, latexes having polyvinyl unsaturation as in the case of starch-polychloroprenes were useful in imparting wet strength in paper. Also starch graft latexes made from dienes or methylacrylates were useful as cold-contact adhesives in glueing wood. Starch graft latexes dry at 25° C. or at higher temperatures to form clear adhesive films.

DETAILED DESCRIPTION OF THE INVENTION

Any cationic starch is suitable to be used in accordance with the invention. Preferably the cationic D.S. (degree of substitution) is from 0.01 to 0.1 and the cationic moiety is a tertiary or quaternary amine ether group such as diethylaminoethyl ether group or a 2-hydroxypropyltrimethylammonium ether group. Those skilled in the art will be aware of any other compositions suitable for use in the invention. Unmodified starch is also suitable as long as it is used with a cationic vinyl monomer. Of critical importance to the invention is that the starch or cationic starch be gelatinized at a temperature of from 80° to 100° C. prior to graft polymerization.

Suitable vinyl monomers include acrylonitrilemethacrylonitrile, t-butylaminomethylmethacrylate, N,N,N-triethylaminomethacrylate, and dienes such as chloroprene, isoprene and the like. It is also suitable to co- and terpolymerize these vinyl monomers onto the gelatinized starch or gelatinized cationic starch backbone.

Reaction mixtures had Brookfield viscosities (30 r.p.m.) ranging from 400 cp. to 3,000 cp. However, after adjustment of acidities to pH 5.5 and blending (500 ml. volumes) on a Waring blendor for 3 minutes, sonification at 20 KHz reduced viscosities to 10–40 cp. Decrease in viscosity due to sonification is not fully understood, but it is suspected that regions of association exist between starch graft particles, probably through the starch moiety, that contribute to viscosity and that these regions are subsequently disassociated by ultrasonic radiation. Although it is possible some starch was degraded experiments showed that the molecular weight of grafted polyacrylonitrile did not decrease as a result of sonic radiation of the latex. Films made from nonsonified dispersions were somewhat hazy but those made from sonified dispersions were transparent in appearance. The solids contained in the sonified dispersions were found by scanning electron microscopy to consist of ball-like particles measuring about 300–1500 A in diameter.

The type of agitation during grafting influences the molecular weights of polyacrylonitrile isolated from the reaction mixture by acid hydrolysis. Graft polymerizabottomed flasks with blade-stirrer action and to 1.78 × 10⁵ when reactions were conducted on a shaker.

Further, starch graft latexes having ionic character on the side chains were made from gelatinized starch which has no ionic character by copolymerization of vinyl monomers such as acrylonitrile and methylacrylate with a vinyl secondary amine such as t-butylaminoethylmethacrylate by cerium(IV) initiator. Also the scope of the preparative method was extended by creating quaternary amine functionality in the grafted side chains. Vinyl monomers such as acrylonitrile and methylacrylate were graft copolymerized with the quaternary amine N,N,N-triethylaminomethacrylate at 25° C. with cerium(IV) initiator to form grafted reaction mixtures that sonified to low viscosity latexes having strong cationic character.

The process for making starch graft latexes was extended to graft copolymerization of dienes such as chloroprene and isoprene as well as to graft terpolymerization of dienes with other vinyl and vinyl amine monomers. Surprisingly, we found that chloroprene which is insoluble in water graft polymerized onto gelatinized starch and cationic starch as readily as water-soluble monomers such as acrylonitrile and methylacrylate by cerium(IV) initiation in aqueous media at 25° C. Films made from starch-polychloroprene latexes were relatively soft in comparison to those made from starch-polyacrylonitrile latexes. Further, graft reactions of starch, acrylonitrile, and chloroprene produced reaction products that sonified to latexes possessing polymerized acrylonitrile and chloroprene moieties.

Although reactions that make starch-polychloroprene latexes require 30–60 minutes, graft reactions that produce starch polyisoprene require several days. However, as in the case of chloroprene, starch-polyisoprene latexes form films that are also soft. Further, isoprene terpolymerizes with acrylonitrile and t-butylaminoethylmethacrylate onto gelatinized starch by cerium(IV) initiation to produce latexes possessing excellent film-forming properties.

Preparation of a cationic starch graft latex need not begin with gelatinization of a previously prepared and isolated granular cationic starch. We demonstrated that, beginning with granular starch, cationic starch graft copolymers can be made in a single reaction vessel over a 3–4 hour period without the need to isolate and refine the cationic starch intermediate. Starch was gelatinized over a period of 10 minutes at 95° C. after which time the appropriate amounts of amine and alkali to make cationic starch were added and heated at 95° C. for another 40 minutes. The reaction mixture was then cooled to 25° C. and the pH adjusted to 4. The cationic starch already in gelatinized form and made in about 1 hour has the same analysis as granular cationic starch made over a period of about 6 hours at 55° C. in the presence of 16% sodium sulfate. Procedures for grafting onto the gelatinized cationic starch made directly from gelatinized starch are the same as those described previously.

Viscosities encountered in making starch graft latexes by grafting onto 8% dispersions of gelatinized starches or cationic starches were minimized by either sonification or jet-cooking techniques. Eight percent dispersions of gelatinized cationic starches were sonified at 20 KHz for 1–3 minutes (50 ml. volumes) to 10–100 cp. Eight percent dispersions of workable viscosities were made by jet-cooking 16% slurries of granular starch or cationic starches with super heated steam and then adjusting the final concentration to 8%. Grafting with monomers onto these starches to achieve a 100% weight add-on produced dispersions having 16% solids.

Addition of dioctyl phthalate to acrylonitrile which was used in graft polymerization reactions did not interfere with grafting reactions suggesting the use of plasticizers for monomers whose polymers have high glass transition temperatures.

The following examples are intended to further illustrate the invention but should not be interpreted as limiting the scope of the invention as defined above. All percentages disclosed herein are by weight unless otherwise specified.

EXAMPLE 1

Granular cationic starches having diethylaminoethyl (tertiary amine) ether groups and which served as starting materials for the preparation of cationic starch graft latexes are made by the following procedure. Starch (220 g.) was slurried in a solution containing 500 ml. of water, the appropriate amounts of sodium sulfate, sodium hydroxide and the tertiary amine 2-chlorodiethylaminoethyl hydrochloride. The slurry was heated with stirring at 55° C. for 6 hours and then cooled to 25° C. at which temperature the pH was adjusted to 5.5 with 1N NaOH. After the solids were separated by centrifugation, the supernatant was discarded. Residual salts in the product were removed by sequentially slurrying with distilled water, centrifuging and then discarding supernatants three times. Wet cationic starch was slurried in absolute ethyl alcohol, filtered and then finally air dried in a force draft hood. Conditions for making products of varying nitrogen values are tabulated in the table below.

| Prep. | NaOH, g. | Amine, g. | N in cationic starch, % |
|---|---|---|---|
| 1 | 3.82 | 3.50 | 0.13 |
| 2 | 4.07 | 6.75 | 0.26 |
| 3 | 4.82 | 13.50 | 0.42 |
| 4 | 5.50 | 15.50 | 0.51 |
| 5 | 11.00 | 27.00 | 0.90 |

EXAMPLE 2

Granular cationic starches possessing quaternary amine functionality used as starting materials to make cationic starch graft latexes are made by the same procedure described in Example 1 except for the use of 3-chloro-2-hydroxypropyltrimethylammonium chloride instead of 2-chloro-diethylaminoethyl hydrochloride. Conditions to make products are tabulated in the table below.

| Prep. | NaOH, g. | Amine, g. | N in cationic starch, % |
|---|---|---|---|
| 1 | 5 | 7.28 | 0.22 |
| 2 | 6 | 14.04 | 0.39 |
| 3 | 11 | 26.00 | 0.69 |

EXAMPLE 3

Cationic starch (22 g.) having tertiary amine functionality was gelatinized in 500 ml. of distilled water under nitrogen at 95° C. for 5–30 minutes. The solution was cooled to 25° C. at which temperature initiation and graft reactions were conducted. In some cases graft reactions were made in stoppered Erlenmeyer flasks shaken on a Burrell wrist-action shaker and in others reactions were made using rotating blade stirrer action in round-bottomed flasks. In some experiments ceric ammonium nitrate in nitric acid solution was added to gelatinized cationic starch and either shaken or stirred 20 minutes before addition of freshly distilled acrylonitrile. In other reactions, acrylonitrile was added to gelatinized cationic starch and the mixture was either shaken or stirred 20 minutes before addition of the cerium(IV) reagent. After 3 hours, mixtures (pH 1.8–2) were transferred to blender jars and blended about 3 minutes at high speeds to form smooth creams. Blending was continued for 1 minute at low speeds while acidities were adjusted to pH 5.5 with 1N NaOH. Reaction dispersions, blended 3 minutes, and having viscosities of 1,500–3,000 cp., were poured into 2-oz. bottles which were then cooled in ice water. The probe tip of a Heat Systems ultrasonic probe, which measured 1 cm.$^2$, was immersed to the depth of 1 cm. below the surface of dispersions which were then sonified at 20 KHz for 3 minutes. Preparation of a series of tertiary amine cationic starch (TAS) polyacrylonitrile (PAN) latexes is given in the table below.

realize that methacrylonitrile also grafts to starch and cationic starch.

EXAMPLE 4

Acrylonitrile can be graft polymerized by cerium(IV) initiation at 25° C. onto gelatinized quaternary amine cationic starch (prepared according to Example 2) by means and conditions described in Example 3 to form copolymers that sonify to low viscosity latexes. Non-sonified reaction mixtures had viscosities of 400 cp. which are about one-fourth of those obtained from nonsonified reaction mixtures described for products in Example 3 which were made from cationic starches having tertiary amine functionality. Typical reaction and product data for quaternary amine starch (QAS) polyacrylonitrile (PAN) products are listed in the table below.

QAS-PAN Preparations$^a$

| Prep. | QAS N,% | Agitator | AGU:Ce(IV) mol:mol | QAS-PAN N, % | PAN, $M_n$ |
|---|---|---|---|---|---|
| 1 | 0.39 | ST | 45 | 13.07 | 231,850 |
| 2 | 0.39 | SH | 45 | 12.81 | 178,188 |

$^a$Cationic starch (24 g.) gelatinized in 600 ml. of water by heating under nitrogen at 95° C. for 30 minutes was cooled to 25° C. and then reacted with AN and cerium (IV) reagent. The AN to AGU molar ratio was 3.1 and the reaction time 3 hours.

EXAMPLE 5

Starch graft latexes were prepared in which cationic character was contained in a copolymer side chain Preparation of TAS-PAN$^a$

| H$_2$O, ml. | AN, g. | AN:TA g.:g. (mol:mol) | Ce(IV) 0.2M ml. | AGU:Ce(IV),$^b$ mol:mol | TAS-PAN Product | |
|---|---|---|---|---|---|---|
| | | | | | N, % | TAS:PAN, g.:g. |
| 250 | 24 | 1.22 (3.69) | 7.1 | 80 | 10.70 | 0.58:0.42 |
| 250 | 28 | 1.42 (4.29) | 7.1 | 80 | 5.10 | 0.82:0.18 |
| 500 | 48 | 2.44 (7.38) | 7.1 | 80 | 7.10 | 0.73:0.27 |
| 500 | 24 | 1.22 | 7.1 | 80 | 9.35 | 0.65:0.35 |
| 500 | 24 | 1.22 | 14.2 | 40 | 12.25 | 0.54:0.46 |
| 500 | 48 | 2.44 | 14.2 | 40 | 13.42 | 0.49:0.51 |

$^a$Acrylonitrile (AN) was added to 19.5 g. (dry basis) of TAS (0.42% N) that had been gelatinized at 95°C. for 30 minutes and then cooled to 25°C. The mixture was stirred 20 minutes before addition of cerium (IV). Stirring was continued for 3 hours.
$^b$AGU = anhydroglucose unit. Corrected for weight of amine sulfate salt.
$^c$Percent nitrogen of total solids precipitated from the dispersion.

Influence of the type of agitation during grafting on the molecular weights of grafted polyacrylonitrile moiety is given in the table below.

Influence of stirring action$^a$

| Prep.$^a$ | TAS N, % | Agitator | TAS-PAN N, % | PAN, $M_n^d$ |
|---|---|---|---|---|
| 1 | 0.42 | ST$^b$ | 12.25 | 1,094,000 |
| 2 | 0.42 | SH$^c$ | 13.50 | 506,000 |
| 3 | 0.51 | ST | 12.32 | 1,017,000 |
| 4 | 0.51 | SH | 12.83 | 455,000 |

$^a$Reactions were conducted at respective AN:AGU and AGU:Ce(IV) mole ratios of 3.69 and 40 at 25°C. for 3 hours.
$^b$Reaction was conducted in a round-bottomed flask using a rotating blade stirrer at 180 r.p.m.
$^c$Reaction was conducted in a stoppered Erlenmeyer flask clamped to a Burrell wrist-action shaker.
$^d$Number-average molecular weight determined by GPC.

The above-described reactions and processes are not restricted to acrylonitrile. Those skilled in the art will graft instead of in starch. Starch (24 g.) was heated at 95° C. in 600 ml. of water under nitrogen with stirring for 1 hour and then cooled to 25° C. Acrylonitrile and about 20 ml. of an aqueous solution containing t-butylaminoethylmethacrylate adjusted to pH 4 was added to the starch solution and stirred 20 minutes. Graft polymerization was initiated by addition of 0.2M cerium(IV) in 1N HNO$_3$ and reaction continued for 3 hours. The reaction mixture was blended 3 minutes at a high rate of shear on a Waring blendor and then adjusted to pH 5.5 with 1N NaOH while blending at a low rate of shear. Sonification of blended reaction mixtures reduced the viscosities to about 10 cp. Amounts of reagents used to make starch-poly(acrylonitrile-co-t-butylaminoethylmethacrylate) latexes as well as the compositions of copolymer side chains are listed in the table below. Graft Terpolymerization of Acrylonitrile (AN) and T-butylaminoethylmethacrylate (TBAEM) Onto Gelatinized Starch by Cerium(IV) Initiation at 25° C.$^a$

| AN TBAEM mol/mol | Starch graft product N, % | Isolated side chain graft | | Pol AN / Pol TBAEM mol/mol |
|---|---|---|---|---|
| | | N, % | Cl, % | |
| 85.63 | 13.74 | 25.16 | 0.56 | 52.0 |
| 28.55 | 12.34 | 22.87 | 2.13 | 16.5 |
| 14.26 | 10.22 | 20.46 | 3.90 | 8.4 |

<sup>a</sup>Starch (24 g.) was gelatinized at 95° C. under nitrogen for 60 minutes. The AN:AGU and AGU:Ce(IV) molar ratios were 3 and 50, respectively. Graft reactions were conducted in round-bottomed flasks for 3 hours using stirrer-action agitation.

EXAMPLE 6

Graft terpolymerization of acrylonitrile and t-butylaminoethylmethacrylate onto gelatinized cationic starch having tertiary amines onto gelatinized cationic starch having quaternary amines were conducted by the methods described in Example 5.

Graft reactions involving a quaternary amine cationic starch (0.22% N) with AN and TBAEM at a molar ratio of 85 gave a product having 13.1% N while reaction involving tertiary amine cationic starch (0.26% N) with the same AN to TBAEM ratio gave a product having 12.85% N.

EXAMPLE 7

Acrylonitrile and N,N,N-trimethylamino-2-hydroxypropylmethacrylate at a molar ratio of 40 were copolymerized onto gelatinized starch by the methods described in Example 5 to produce graft copolymers having quaternary amine functionality in the side chain. Reaction mixtures adjusted to pH 5.5 sonified to latexes that dried at 25° C. or higher temperatures to clear films. Solids isolated from one latex had 12.91% N and 0.25% Cl.

EXAMPLE 8

Methylacrylate graft polymerizes onto gelatinized starch and cationic starch as readily as acrylonitrile. Conditions of preparation described in Examples 3, 4, 5, and 6 are also used to make starch-polymethylacrylate graft latexes. These latexes dry at 25° C. or at higher temperatures to clear adhesive films. Solids isolated from these latexes were found to analyze as high as 60% polymethylacrylate moiety and 40% starch.

EXAMPLE 9

The water-insoluble diene monomer chloroprene was found to graft polymerize onto starch and cationic starches as readily as water-soluble monomers such as acrylonitrile and methylacrylate at 25° C. by cerium-(IV) initiation. Tertiary amine cationic starch (24 g.) containing 0.26% N (Example 1) was gelatinized in 600 ml. of water under nitrogen at 95° C. for 30 minutes and then cooled to 25° C. Two hundred and fifty milliliters of the dispersion were placed in a stoppered Erlenmeyer flask and shaken on a Burrell shaker for 10 minutes after which time 10 g. of freshly distilled chloroprene was added and shaken for another 10 minutes. Seven milliliters of 0.2N cerium(IV) reagent in 1N HNO₃ were added to the dispersion and shaken for 1-3 hours. Contents of the reaction flask were poured into a blender jar and blended 3 minutes at a high rate of shear. The pH was then adjusted to 5.5 with 1N NaOH at a low rate of shear. Blended reaction mixture was then sonified in 50 ml. aliquots at 20 KHz for 1-3 minutes. Viscosities of nonsonified dispersions were 1200-1600 cp. and the sonified latexes were 10-40 cp. Starch grafts isolated from latexes by alcohol precipitation were found to analyze 16-17% chlorine and 47-48% carbon. Addition of greater amounts of chloroprene to the cationic starch gave latex products having greater chlorine values. For example addition of 20 g. of chloroprene gave a starch graft analyzing 24% chlorine.

EXAMPLE 10

Chloroprene and acrylonitrile graft polymerized onto gelatinized cationic starch by the methods described in Example 9. Amounts of reactants were 250 ml. of 4% gelatinized cationic starch (tertiary amine, 0.26% N), 4 g. of acrylonitrile, 9 g. of chloroprene, and 7 ml. of 0.2N cerium(IV) reagent in 1N $HNO_3$. The isolated graft product analyzed 17.38% Cl, 48.68% C, 6.06% H, and 1.3% N.

EXAMPLE 11

Isoprene like chloroprene will graft to starch but unlike chloroprene the rate is not fast. 13 grams of cationic starch (tertiary amine, 0.26% N) were gelatinized in 300 ml. of water under nitrogen at 95° C. for 15 minutes and then cooled to 25° C. To the mixture were then added 7 ml. of 0.2N cerium(IV) reagent in 0.1N $HNO_3$ and stirred 5 minutes. Finally, 15 ml. of isoprene were added and shaken intermittenly for 48 hours. The dispersion was blended 3 minutes and the pH adjusted to 5.5 with 1N NaOH. Sonification of 50-ml. aliquots of blended dispersion at 20 KHz for 3 minutes reduced the viscosity to 10 cp. The latex was found to analyze 35% by weight of polyisoprene. Acid hydrolysis of 4 g. of isolated starch-polyisoprene graft copolymer in 1N HCl for 2 hours at 95° C. produced 1.45 g. of a rubbery material that analyzed as polyisoprene.

EXAMPLE 12

The procedure to make starch-polyisoprene latexes as described in Example 11 was also used to make starch terpolymer graft latexes of acrylonitrile, isoprene, and t-butylaminoethylmethacrylate. The latter vinyl amine permits the insertion of cationic character in the vinyl side chain. To 13 g. of starch gelatinized in 300 ml. of water for 1 hour at 95° C. under nitrogen and then cooled to 25° C. were added 15 ml. of acrylonitrile and 1.5 g. of t-butylaminoethylmethacrylate (adjusted to pH 4). After stirring the mixture for 5 minutes, 15 ml. of isoprene were added and stirring continued for another 5 minutes. Finally, 7 ml. of 0.2N cerium(IV) reagent in 0.1N $HNO_3$ were added and reaction allowed to proceed at 25° C. for 48 hours. The reaction mixture was blended for 3 minutes and the pH adjusted to 5.5 with 1N NaOH. Fifty-milliliter aliquots were sonified for 3 minutes at 20 KHz to form the latex. Analysis of the solid graft copolymer isolated from the latex by alcohol precipitation showed that 42% (by weight) was vinyl polymer and of this 31% was polymerized acrylonitrile.

Films made from these latexes were soft relative to those made from starch-polyacrylonitrile latexes suggesting that the regularity of acrylonitrile polymerization was disrupted. Hydrolysis of 4 g. of solid graft polymer in 1N HCl for 2 hours at 95° C. produced 1.6 g. of insoluble elastomeric residue.

EXAMPLE 13

Several starch latexes wee evaluated as additives in paper making. Handsheets were prepared from 0.24% slurries of unbleached soft Kraft pulp by methods recommended by Tappi Standard Methods. Latexes were added to the slurries at a 2% solids concentration based on the dry weight of pulp. Handsheets were dried in an oven at 100° C. for 20 minutes. Results of tests based on Tappi Standard Methods are tabulated in the table below.

| Latex | Strength values of handsheets Breaking Length (m.) Wet | Dry | Graft ret. in pulp, % |
|---|---|---|---|
| Control | 125 | 5400 | |
| TAS (0.26% N)-PAN (1:1) | 304 | 7450 | 40 |
| QAS (0.22% N)-PAN (1:1) | 228 | 7320 | 42 |
| S-Poly(AN-co-TBAEM (1:1) AN:TBAEM = 8 | 254 | 7000 | 23 |
| TAS (0.26% N)-PiP (14% Cl) | 1190 | 7830 | |

EXAMPLE 14

Presumably, the small particle size of starch graft latexes and the high glass transition temperature of grafted polyacrylonitrile moiety of QAS (0.22% N)-PAN (1:1) makes it well suited as a reinforcer in rubber. A comparison of QAS (0.22% N)-PAN (1:1) latex with carbon black (IRB-No. 3, Nat. Bur. of Stds.) as a reinforcer in rubber was made. Both materials were compounded with 100 g. of HYCAR (1092-30) a 30 Mooney, acrylonitrilebutadiene copolymer rubber and then cured under the same conditions at 305° F. The weight of starch graft was 31.5 g. (25 ml.) and the weight of carbon black was 45 g. (25 ml.). The cured reinforced rubbers were tested by ASTM Standard Methods, D-15, Part 28. Results are tabulated below.

| Reinforcer | Strength values of reinforced rubbers Tensile, p.s.i. | Elongation, % | Moduli (300%) p.s.i. |
|---|---|---|---|
| Starch graft | 2080 | 590 | 720 |
| Carbon black | 1880 | 430 | 460 |

EXAMPLE 15

Blocks of birch wood measuring 1 inch × 1 inch × 2 inch were glued face to face on the 1 square inch faces with 8% TAS (0.26% N)-PiP latex in the absence of curing agents and pressure at room temperature. Glued blocks of wood were equilibrated at room temperature in a 50% relative humidity room for 24 hours before determining the adhesive bond strengths on an Instrom Tensile Tester. Average bond strengths of 510 p.s.i. were obtained.

We claim:

1. A method of producing stable latexes comprising the following steps:
   a. graft polymerizing gelatinized cationic starch with a vinyl monomer in quantities such that a vinyl monomer add-on of from about 10% to 200% occurs in the presence of a cerium(IV) initiator in an aqueous media containing from 1% to 20% solids; and
   sonicating the dispersion resulting from step (a) at 20 KHz for 1–3 minutes to form a stable dispersion containing cationic starch graft latex solids having particle diameters of from 300 to 1500 A, said stable dispersion having a Brookfield viscosity of from 10 to 100 cp.

2. A method as described in claim 1 wherein the gelatinized cationic starch is gelatinized quaternary amine- or tertiary amine-starch ethers.

3. A method as described in claim 1 wherein the vinyl monomer is a vinyl secondary amine or a vinyl quaternary amine, or mixtures of the same.

4. A method as described in claim 1 wherein the vinyl monomer is acrylonitrile, methylacrylate, methacrylonitrile, N,N,N-triethylaminomethacrylate, or t-butylaminoethylmethacrylate, or mixtures of the same.

5. A method as described in claim 1 wherein the gelatinized cationic starch is diethylaminoethyl starch ether or 2-hydroxypropyltrimethylammonium starch ether.

6. A method as described in claim 1 wherein the gelatinized cationic starch has a cationic degree of substitution of from about 0.01 to 0.1.

7. A method as described to claim 1 wherein the viscosity of the dispersion resulting from step (a) is reduced to from 10 to 40 cp.

8. A method of producing stable latexes comprising the following steps:
   a. graft polymerizing gelatinous starch with a cationic vinyl monomer in quantities such that a cationic vinyl monomer add-on of about 10% to 200% occurs in the presence of a cerium(IV) initiator in an aqueous media containing from 1% to 20% solids; and
   b. reducing the viscosity of the dispersion resulting from step (a) to from 10 to 100 cp. to produce a stable dispersion containing starch graft cationic latex solids having particle diameters of from 300 to 1500 A.

9. A method as described in claim 10 wherein the cationic vinyl monomer is a vinyl seconary amine or a vinyl quaternary amine, or a mixture of the same.

10. A method as described in claim 10 wherein the cationic vinyl monomer is N,N,N-triethylaminomethacrylate or t-butylaminoethylmethacrylate, or mixtures of the same.

11. A stable gelatinized cationic starch graft copolymer latex produced by the process of claim 1.

12. A stable gelatinized starch graft copolymer latex produced by the process of claim 8.

* * * * *